United States Patent [19]
Ketcham

[11] Patent Number: 5,850,734
[45] Date of Patent: Dec. 22, 1998

[54] CLOSE-COUPLED CATALYTIC CONVERTER SYSTEM

[75] Inventor: Thomas D. Ketcham, Big Flats, N.Y.

[73] Assignee: Corning Incorporated, Corning, N.Y.

[21] Appl. No.: 707,280

[22] Filed: Sep. 3, 1996

Related U.S. Application Data

[60] Provisional application No. 60/003,857 Sep. 18, 1995.

[51] Int. Cl.⁶ .................................. F01N 3/20; F01N 3/28
[52] U.S. Cl. ............................. 60/274; 60/288; 422/171; 422/176
[58] Field of Search .......................... 60/274, 284, 288; 422/170, 171, 176, 180

[56] References Cited

U.S. PATENT DOCUMENTS

| | | | |
|---|---|---|---|
| 3,144,309 | 8/1964 | Sparrow | 60/288 X |
| 5,277,026 | 1/1994 | Boll et al. | 60/288 |
| 5,603,216 | 2/1997 | Guile et al. | 60/288 |
| 5,619,853 | 4/1997 | Brown | 60/288 |
| 5,635,141 | 6/1997 | Fischer | 60/288 X |
| 5,657,626 | 8/1997 | Brown et al. | 60/288 X |
| 5,693,294 | 12/1997 | Anderson et al. | 60/288 X |
| 5,709,081 | 1/1998 | Bruestle | 60/288 X |
| 5,787,707 | 8/1998 | Hertl | 60/297 |

FOREIGN PATENT DOCUMENTS

| | | |
|---|---|---|
| 3919343 | 12/1990 | Germany. |
| 9004614.5 | 4/1991 | Germany. |
| 4341380 | 6/1995 | Germany. |

*Primary Examiner*—Tony M. Argenbright
*Attorney, Agent, or Firm*—Timothy M. Schaeberle

[57] ABSTRACT

The instant invention is directed at an in-line engine exhaust system comprised of the following: (1) a first close-coupled catalyzed structure located in the exhaust stream, the catalyzed structure having an inlet and an outlet end disposed in a housing, a lightoff temperature, and comprising a first substantially unobstructed flow region, and a second more obstructed flow region abutting the first region, the first region being disposed to provide a substantially unobstructed flow path for exhaust gases in the exhaust gas stream; and, (2) a flow diverter connected to a secondary air source and disposed in the housing for diverting the exhaust gases away from the first region. Furthermore, the exhaust system may be provided with a second catalyzed structure located in the exhaust gas stream downstream from the housing. Also disclosed herein is a method of treating a hydrocarbon-containing engine exhaust steam utilizing the aforementioned inventive exhaust system.

28 Claims, 9 Drawing Sheets

Deflector        Secondary Air

CLOSE-COUPLED CATALYTIC CONVERTER SYSTEM

This application claims the benefit of U.S. Provisional Application No. 60/003,857, filed Sep. 18, 1995, entitled "Close-Coupled Catalytic Converter System", by Thomas D. Ketcham.

BACKGROUND OF THE INVENTION

The invention relates to a catalytic converter exhaust system located in close proximity to internal combustion engine and capable of meeting the California ultra-low emission vehicle (ULEV) standard.

While catalytic converters are well known for reducing oxides of nitrogen (NOx), and oxidizing hydrocarbons and carbon monoxide from automobile exhaust, these reactions typically take place after the catalyst has attained its light-off temperature, at which point the catalyst begins to convert the hydrocarbons to harmless gases. The typical catalytic light-off time for most internal combustion engine systems is around 50 to 120 seconds (generally in the range of 200°–350° C.), with the actual catalytic light-off time for any system depending on a number of factors, including, the position of the catalyst relative to the engine, the aging of the catalyst, as well as the noble metal loading. Seventy to eighty percent of hydrocarbon emissions from automotive vehicles are emitted during this first minute, or so, of "cold start" engine operation, i.e., during this period large amounts of hydrocarbons are likely to be discharged into the atmosphere without additional measures. The problem is made worse by the fact that the engine requires rich fuel-air ratio to operate during cold-start thus, increasing even further the amount of unburned hydrocarbons discharged. Increasing the effectiveness of automotive emission control systems during cold start, so that the amount of hydrocarbons discharged into the atmosphere during cold-start are kept at extremely low levels, has become important not only from an environmental standpoint, but just as importantly, the ULEV standards require it.

Various schemes have been proposed for meeting the stringent ULEV standards during cold start including, the use of electrically heated catalysts (EHCs) to reduce the light-off time of the main catalyst, the use of molecular sieve structures (hydrocarbon adsorbers) to adsorb and hold significant amounts of hydrocarbons until the converter has attained its light-off temperature, as well as combinations of both.

Recently, improved in-line and by-pass exhaust control systems respectively have been disclosed in, co-assigned U.S. applications Ser. No. 08/484,617, now U.S. Pat. No. 5,787,707 (Hertl et al.) and 08/375,699, now U.S. Pat. No. 5,603,216 (Guile et al.); both herein incorporated by reference. The Hertl reference discloses an exhaust system possessing a molecular sieve structure having a substantially unobstructed flow region adjacent a second more obstructed flow region and a flow diverter means for diverting the flow of exhaust away from the first region. On the other hand, the Guile reference discloses a by-pass adsorber system wherein flow patterns from a secondary air source are used to direct exhaust gas flow to and away from the adsorber during cold-start.

One final scheme which has been investigated is the use of a "pre-catalyst", i.e., a three-way catalyst of low thermal mass mounted in the exhaust manifold very close to the engine block or exhaust valves. However, this approach has not been altogether effective due to the fact that the location of the catalyst is very close to the engine block thus continuously exposing the catalyst to the very hot exhaust gases; this exposure drastically and adversely effected the durability of the pre-catalyst structure.

There, therefore, continues to be a need for, and accordingly, it is the object of the present invention, to provide an even simpler and more improved engine exhaust systems capable of meeting the strict California ULEV standards.

SUMMARY OF THE INVENTION

The instant invention is directed at an in-line engine exhaust system comprised of the following: (1) a first close-coupled catalyzed structure and located in the exhaust stream, the catalyzed structure having an inlet and an outlet end disposed in a housing, a lightoff temperature, and comprising a first substantially unobstructed flow region, and a second more obstructed flow region abutting the first region, the first region being disposed to provide a substantially unobstructed flow path for exhaust gases in the exhaust gas stream, and, (2) a flow diverter connected to a secondary air source and located in the housing for diverting the exhaust gases away from the first region. Additionally, the exhaust system may be provided with a second catalyzed structure located in the exhaust gas stream at a position downstream from the housing.

Also disclosed herein, is a method of treating a hydrocarbon-containing engine exhaust stream which comprises first causing exhaust gases from an engine exhaust gas stream to flow through the close coupled catalyzed structure and thereafter through a main catalyzed structure having a light-off temperature. As described above, it is critical that the close-coupled catalyzed structure have an inlet and outlet end disposed in a housing, that it exhibits a light-off temperature, and that it possess a first substantially unobstructed flow region, and a second more obstructed flow region abutting the first region. Finally, it is necessary that the first region be located in the exhaust stream such that the first region provides a substantially unobstructed flow path for the exhaust gases. Critical to the proper performance of the inventive method is that prior to the main catalyzed structure attaining its light-off temperature, a secondary air source located in the housing is activated for diverting a substantial portion the exhaust gases away from the first region and through the second region. Once the main catalyzed structure has attained its light-off temperature, the secondary air is de-activated resulting in a substantial portion of the exhaust gases flowing through the first region and away from the second region.

BRIEF DESCRIPTION OF THE DRAWINGS

FIG. 8a is an exhaust system sectional (longitudinal) view which illustrates the direction of exhaust flow before the main catalyzed structure has attained light-off; 8b illustrates the diversion of air through the first region after light-off and after the outlet end flow diverter has been deactivated;

FIG. 9b is an enlarged illustration of the air injection tube/diverter plate configuration depicted in FIG. 9a.

DETAILED DESCRIPTION OF THE INVENTION

The object of the invention, to reduce the hydrocarbon emissions of an exhaust system during cold start sufficiently enough to meet the stringent ULEV standards, is achieved by taking advantage of the flow dynamics of the exhaust stream through a honeycomb structure. I have observed that the flow dynamics of the engine exhaust system of the invention is such that the exhaust gases in the exhaust gas stream between an engine and any honeycomb structure tend to flow through a path of least resistance from the engine and out to the atmosphere.

Generally speaking, in the standard cone-shaped exhaust can design in which a generally circular honeycomb catalytic structure is centrally disposed in a can, this path will be through the central region of the catalytic structure. As a result, the exhaust gases will tend to flow through this central region of the cellular substrate at a faster rate than through the peripheral regions of the structures. For a non-symmetrical can design on the other hand, the same flow dynamics are observed, that is the exhaust gases tend to flow faster through the path of least resistance to flow, which is the some "off-center" region, the location of which depends upon the can design utilized.

Figure 1:
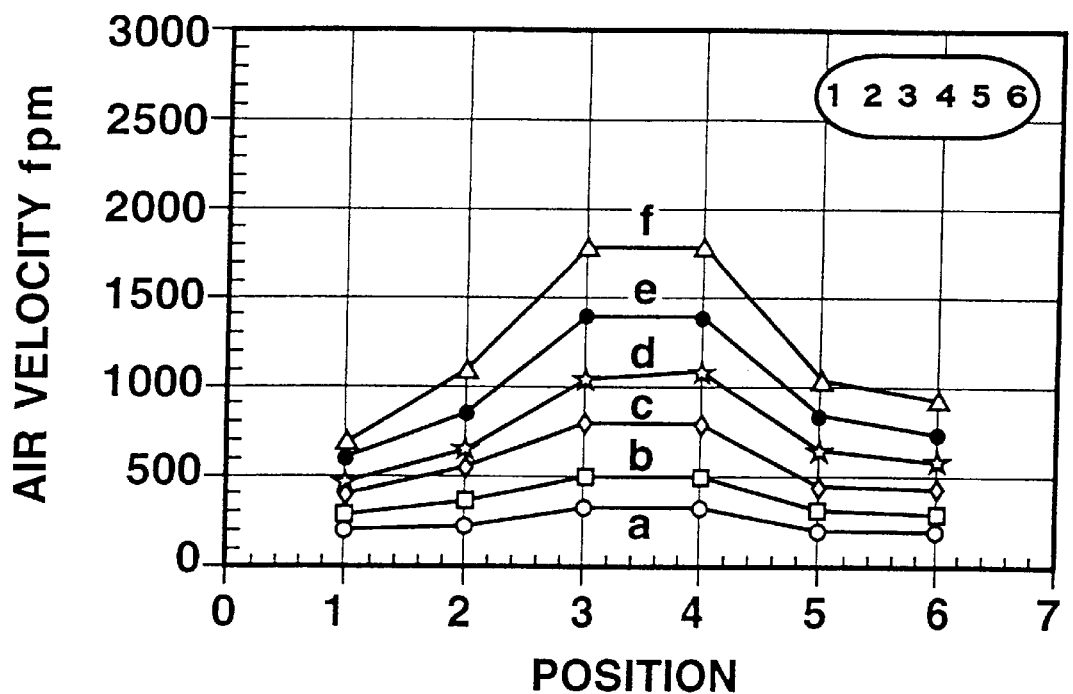
FIG. 1 is a graph illustrating the flow profile across an oval extruded honeycomb substrate in an oval can at various space velocities; the configuration as illustrated in FIG. 2.

This observed flow dynamics, as described above, is illustrated in FIG. 1 for an oval extruded honeycomb substrate centrally disposed in an oval can design. The flow rates through various sections of the substrate were measured using six probes positioned across the oval substrate as shown in the inset and plotted along the x-axis as numerals 1–6. To determine the flow profile across the substrate cross-section, the substrate was contacted with air at space velocities ranging from 30 cubic feet per minute (cfpm) to 150 cfpm, increasing in 30 cfpm increments and plotted as flow profiles a–f, respectively. As shown in FIG. 1, at the lower velocities, the air flow across the substrate cross-section as measured in the aforementioned manner, is fairly uniform. As the space velocity increases, the flow profile becomes increasingly variable, with the flow rate at and near the center of the substrate, that region represented by probe regions 3–4, being higher than the flow rates through the peripheral regions (probe regions 1–2 and 5–6).

Figure 1A:
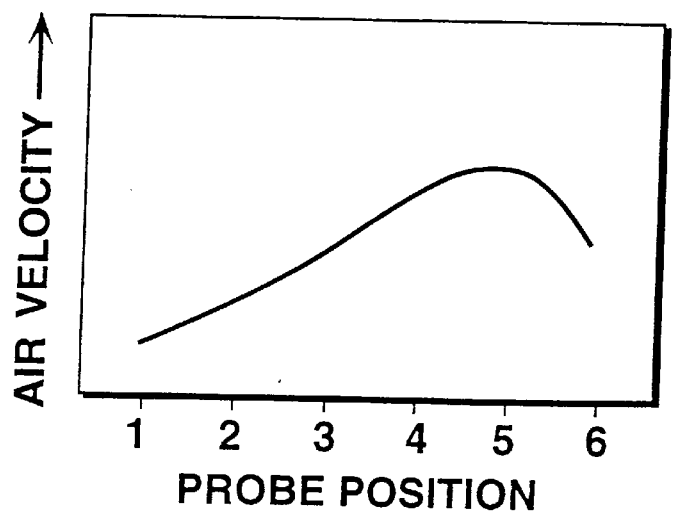
FIG. 1a is a similar graph illustrating the flow profile across an oval extruded honeycomb disposed in a non-symmetrical can design; the configuration as shown in FIG. 2a below.
Figure 2:
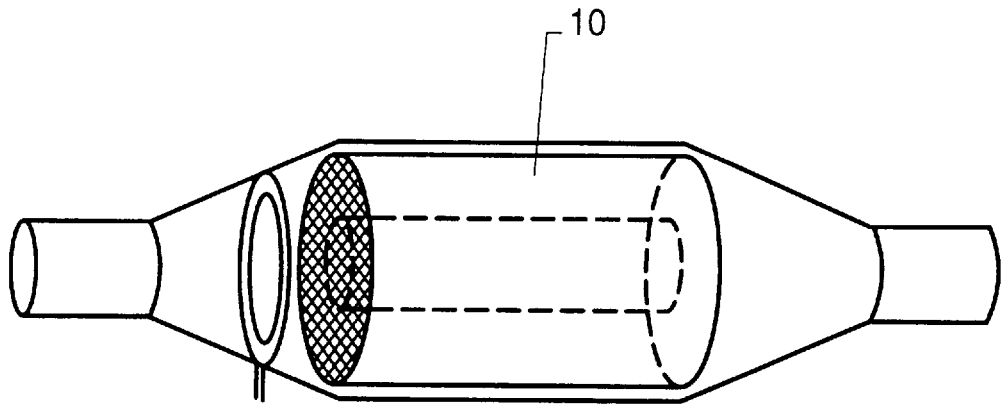
FIG. 2 is a sectional (longitudinal) view of a honeycomb structure within an exhaust system in which exhaust gas flows from the engine through the honeycomb structure.
Figure 2A:
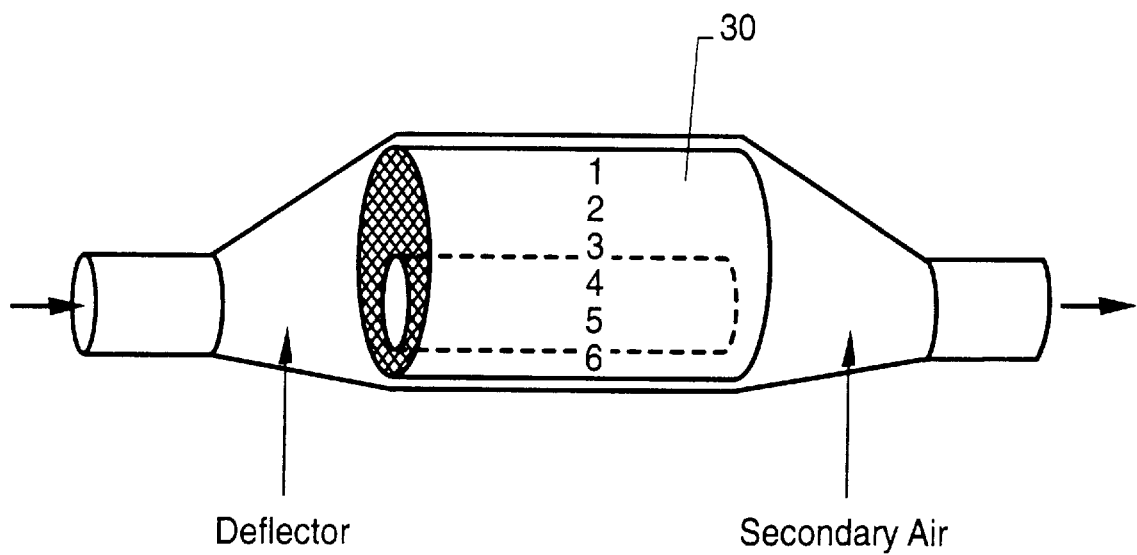
FIG. 2a is a cross-sectional view of another honeycomb structure in an exhaust system, the system exhibiting a non-symmetrical can design with the honeycomb construction disposed therein.

Similarly, for a honeycomb substrate disposed in a non-symmetric can design such as shown in FIG. 2a, similar flow dynamics as described above are observed. The flow profile of the can design of FIG. 2a for a honeycomb substrate 30 having a uniform cross-section and without an open flow region (e.g., a hole or larger/variable cells) is shown in FIG. 1a; probe positions 1–6, indicated along the substrate 30, are also designated the same along x-axis of FIG. 1a. Again, flow through the region of the substrate found along the flow path of least resistance probe regions 4–6 is faster than the flow rate through the peripheral region or the region away from the path of least resistant flow, probe regions 1–3.

Figure 4:
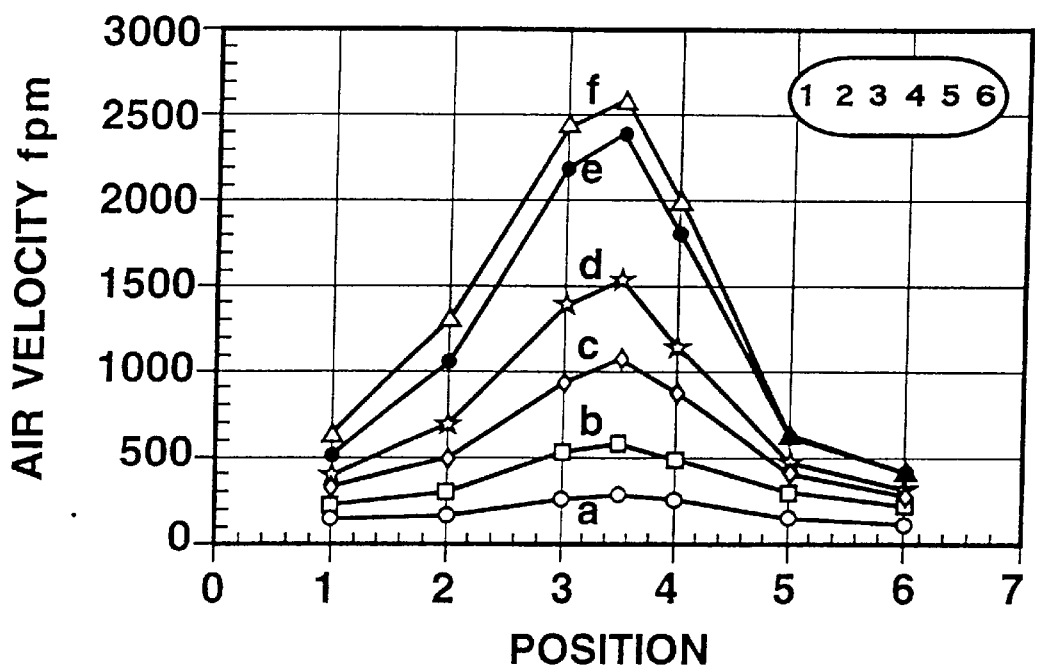
FIG. 4 is a graph showing the flow profile across a oval honeycomb substrate having a 0.50" hole cut through its center.
Figure 5:
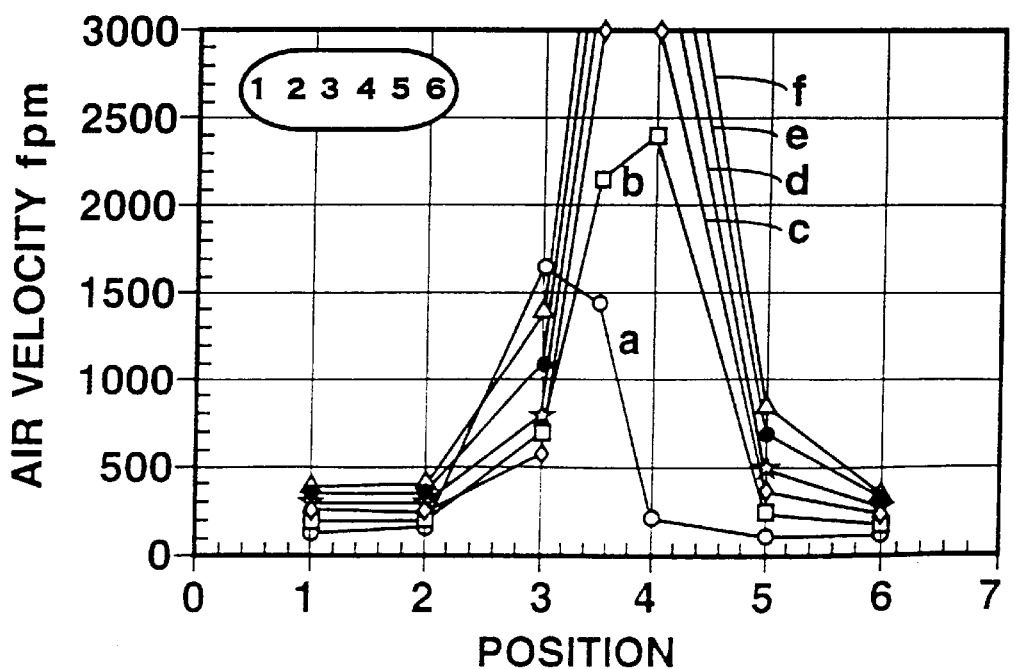
FIG. 5 is a graph showing the flow profile through a similar oval honeycomb as in FIG. 4, but one having a 0.75" hole cut through its center.

This flow dynamics is further illustrated in FIGS. 4 and 5, in which 0.5" and 0.75" holes respectively, have been cut out of the center of two oval extruded honeycomb structures and disposed in oval cans. As shown in the figures, the flow rate through the central region of the substrates is significantly higher than that observed in the regular substrate with no hole in the middle (FIGS. 1& 2). Further, it is observed that the flow rate through the central region of the honeycomb structure is higher for the honeycomb structure having a 0.75" size hole in its center than for the honeycomb structure having a 0.5" hole. This variation in flow rate becomes more pronounced as the space velocity increases from 30 CFPM (line a) to 150 CFPM (line f) in both cases, as was observed in FIG. 1.

Figure 6:
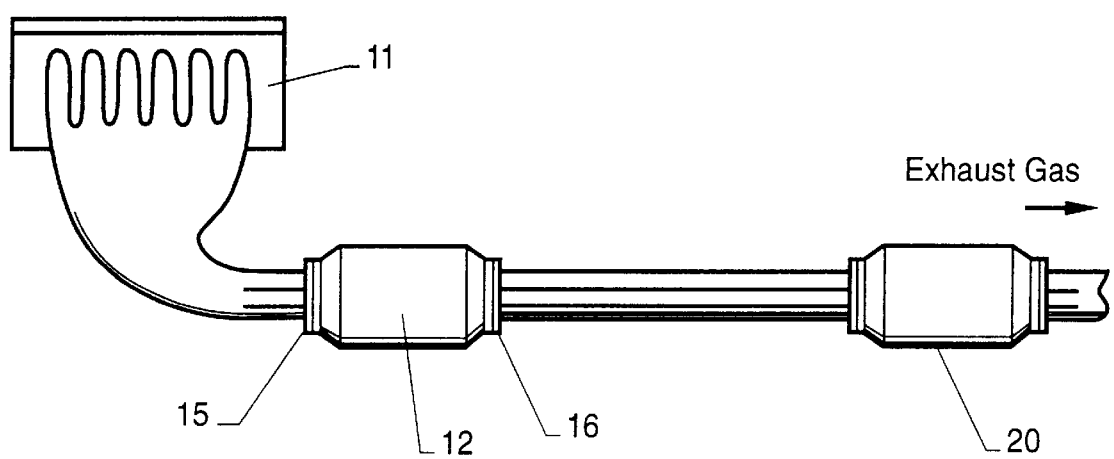
FIG. 6 is a schematic illustration of the inventive exhaust system.
Figure 7A:
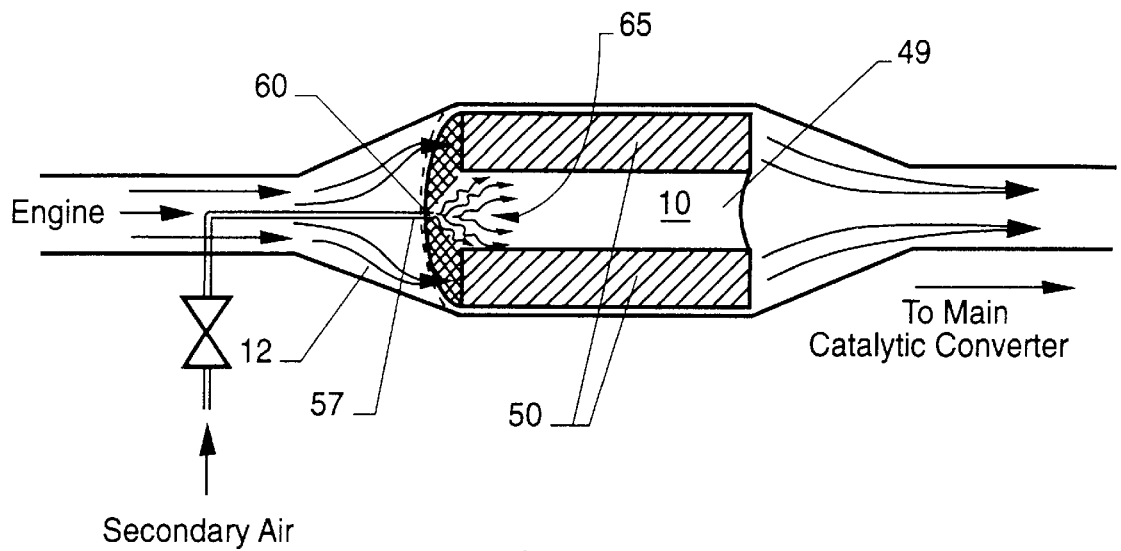
FIGS. 7a and 7b illustrate the use of a cone-shaped flow diverter disposed on the inlet and outlet ends of the close-coupled honeycomb substrate respectively, to direct flow away from the first region during cold start.

We have found that by taking advantage of the above-described flow dynamics, a close-coupled catalyzed structure can be provided with flow diverters, the result being an exhaust system which produces significantly reduced hydrocarbon emissions during the initial 30–60 seconds of engine operation, i.e., during the cold start period. In particular, we have discovered that by leaving the central region of the substrate, close-coupled in the instant invention, open or substantially less obstructed than the peripheral regions, the flow dynamics observed in the honeycomb catalyzed structure (FIGS. 4 &5), can be enhanced. Referring now to FIGS. 6 and 7a/b, specifically, the inventive exhaust system is comprised of the following components: (1) a first close-coupled catalyzed structure 10, located in the exhaust stream downstream from the engine and within a housing 12, and which has an inlet and an outlet end, 15 and 16 respectively, and exhibits a lightoff temperature, and (2) a flow diverter connected to a secondary air source and disposed in the housing for diverting the exhaust gases away from the first region. A "close coupled catalyzed structure" as defined and used herein is a catalyzed structure which is located in the exhaust gas stream at a location within close proximity to the engine. In a preferred embodiment, the close coupled catalytic converter is located at a position within about 100 cm of the engine's combustion chamber or chambers.

The close-coupled catalyzed structure also possesses the novel feature of a first substantially unobstructed flow region 49, and a second more obstructed flow region 50 abutting the first region, with the first region being disposed to provide a substantially unobstructed flow path for exhaust gases in the exhaust gas stream. Preferably, the exhaust system also includes a second catalyzed structure 20, comprised of either a three-way catalyst, a light-off catalyst, an oxidation catalyst or an electrically heated catalyst, which is located in the exhaust gas stream downstream from the housing.

Utilizing the apparatus as disclosed above an inventive method of treating a hydrocarbon-containing engine exhaust stream has been developed. It comprises first causing exhaust gases from an engine exhaust gas stream to flow through the close coupled catalyzed structure and thereafter through a main catalyzed structure having a light-off temperature. As described above, it is critical that the close-coupled catalyzed structure have an inlet and outlet end disposed in a housing, that it exhibits a light-off temperature, and that it possess a first substantially unobstructed flow region, and a second more obstructed flow region abutting the first region. Finally, it is necessary that the first region be located in the exhaust stream such that the first region provides a substantially unobstructed flow path for the exhaust gases. Critical to the proper functioning of the method is that prior to the main catalyzed structure attaining its light-off temperature, a secondary air source located in the housing is activated for diverting a substantial portion the exhaust gases away from the first region and through the second region. Once the main catalyzed structure has attained its light-off temperature, i.e., its full operating temperature wherein it is capable of converting the NOx, hydrocarbon, and carbon monoxide in the exhaust stream, the secondary air is de-activated resulting in a substantial portion of the exhaust gases flowing through the first region and away from the second region.

The advantage of this inventive exhaust system and method is that as soon as the engine fires, upon starting the engine, the close-coupled or first catalyzed structure (a pre-catalyzed structure or "pre-cat") is exposed to hot exhaust gas since there is very little heat loss due to the proximity of the "pre-cat" to the engine or exhaust valves. The "pre-cat" removes the hydrocarbons during the cold start, while additionally the exothermic reaction provides heat to bring the main catalyzed structure up to temperature. In other words, this exhaust system achieves maximum effectiveness in controlling emissions because it does so by maintaining a minimum distance between the pre-cat and the engine block Furthermore, the problem associated with earlier "pre-cat" systems, i.e., the exposure of the "pre-cat" to very hot exhaust gases whenever the engine is on, is avoided. In other words, the adverse effect on the durability of the "pre-cat" experienced by previous "pre-cat" systems, is not a characteristic of this inventive system.

Figure 3:
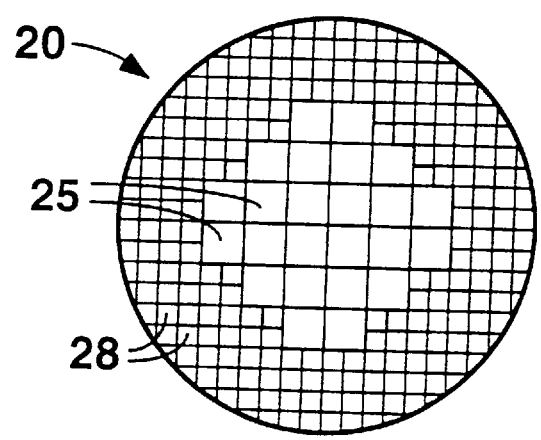
FIG. 3 is a cross-sectional view of an embodiment of the close coupled catalytic structure of the invention having large central cells and smaller peripheral cells.

It is contemplated that the honeycomb structure and accompanying housing can be constructed in any shape wherein there is less obstructed flow resulting in an exhaust path of least resistance. For the cone can design in which a generally circular catalyzed structure is centrally disposed in a cone-shaped can such as in FIG. 2 preferably, the region of less obstructed flow is an hole along the central region of the catalyzed structure akin that depicted in the honeycomb structure illustrated FIGS. 4 and 5. Referring now to FIG. 3 illustrated is an alternative to the construction having a hole through the center, specifically a catalyzed structure, preferably an extruded honeycomb structure 20, in which the cells forming the central region 25 are larger than those forming the peripheral region 28. For a non-symmetrical can design like that illustrated in FIG. 2a, the catalyzed structure 30 can be constructed with a region of less restricted flow 32 having a hole or larger cells, displaced from the center as illustrated in FIG. 2A; alternatively, the hole or larger cells can be formed in the edge of the honeycomb structure along its length. Here, the exhaust flow path of least resistance for the exhaust stream is along the unobstructed flow region (hole or larger cells), i.e., the region marked 4-6 in FIG. 2a.

Depending on the particular application, the engine exhaust system of the invention can be constructed with any one of, or a combination of, air flow diverters of various forms. For example, an exhaust system can comprise a tubular air injection port having a plurality of cone-shaped directional nozzles, an air injection collar having a plurality of nozzles, a tubular air injection port possessing a cone-shaped air injection nozzle, a tubular air injection port possessing a diverter plate, an air injection tube, an air "knife" and/or combinations of these. Furthermore, an exhaust system of the invention can comprise diverters at the inlet end, the outlet end, or on both ends of the catalyzed structure housing. During cold start, the flow diverters operate by projecting, at high velocity, a small jet/stream of secondary air from a secondary air source, into the engine exhaust stream to divert the exhaust gas flow away from the central hole, and through the peripheral region of the close-coupled catalyzed structure.

Preferably, the flow of the secondary air source is at high velocity immediately after engine start-up in order to sufficiently direct all or substantially all of the engine exhaust gases away from the hole. During cold-start, the secondary air flow through the diverter, though at low volume is able to achieve significant jet (strength) due to its high velocity. As the engine speed increases, and as the exhaust gas temperature begins to increase, the velocity of the secondary air jet may be gradually reduced to allow more exhaust gas to flow through the hole in order to more quickly heat up the main catalyzed structure. After the main catalyzed structure has reached its light-off temperature, flow of secondary air may be terminated to allow substantially free and unobstructed flow of the exhaust gases through the hole. Preferably, the size of the diverter is small enough, compared to the size of the housing and the exhaust pipe, so that after the secondary air source is discontinued, exhaust gas flow through the hole is not significantly affected by the presence of the diverter. Preferably, the diverter size and shape is such as to present as little obstruction to exhaust flow as possible when no secondary air pattern is present.

Figure 7B:
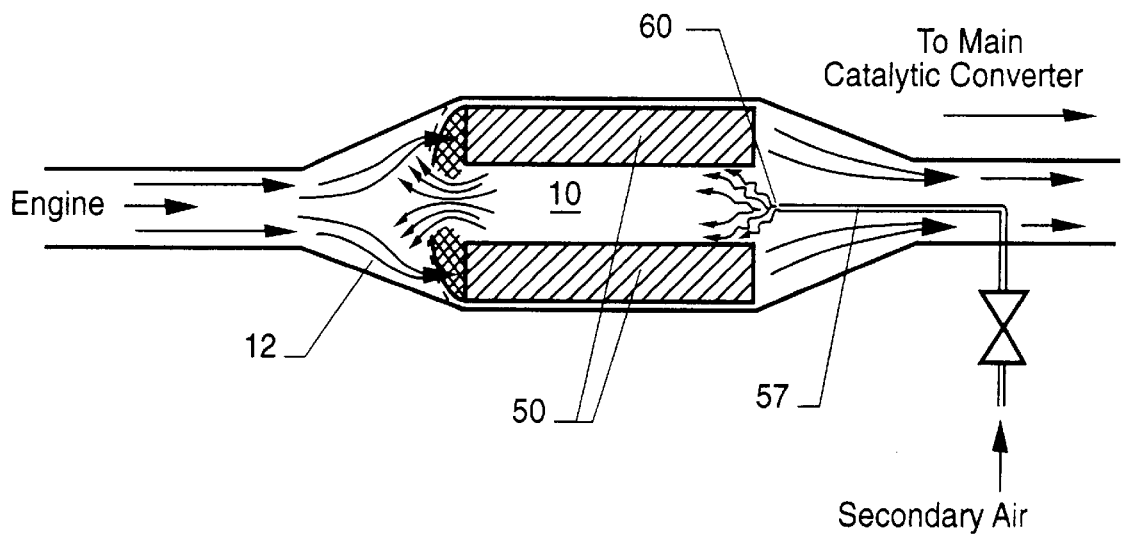

As described above, we have found that air flow through the central hole region can be enhanced using the flow diverters, specifically by placing them on the inlet or outlet end of the catalyzed structure as shown in FIGS. 7a to 7b. Relying on fluid dynamics (fluidics), during cold start the flow diverters are used to divert exhaust gases away from the open flow central region (or hole), and through the peripheral region of the close-coupled catalyzed structures. This is achieved by projecting a jet of secondary air into the exhaust gas flow path to divert the exhaust gas flow in a desired direction. The spray pattern from each of the nozzles is further illustrated in the diagrams.

Generally, the flow diverter is placed on the inlet end of the close-coupled catalyst housing to direct exhaust gas flow away from the hole and into the catalytic honeycomb structure. Alternatively, the flow diverter can be placed at the outlet end (downstream) of the close coupled catalyzed structure, to redirect exhaust gases through the peripheral region of the close-coupled catalyzed structure. For certain applications where the initial speed during cold start is considerably high, or where the engine exhaust is particularly high in hydrocarbons, flow diverters may be placed both at the inlet and outlet end locations to ensure that a substantial amount of the exhaust gas stream is directed through the close-coupled catalyzed structure during cold start.

Referring now specifically to FIG. 7a, the flow diverter is a thin tubular air injection port 57, running parallel to the exhaust gas flow and fitted with a small cone-shaped nozzle 60, positioned at the inlet end of the catalyzed structure housing 12, through which secondary air in the form of a cone-shaped jet 65 can be injected into the housing to effectively block off exhaust gas passage through the hole as shown. The nozzle 60 is capable of projecting a cone-shaped air stream 65 from a secondary air source, to divert the exhaust gases towards the peripheral region 50 of the catalyzed structure 10 and away from the central hole 49 during cold start by blocking passage of exhaust gases through the hole. The nozzle 60 can consist of any directional air outlet capable of directing secondary air stream to effectively form a shield to prevent exhaust gas flow through the region of the catalyzed structure along the exhaust path during cold start. In the embodiment illustrated, during cold start, the flow diverter is activated by allowing secondary air to pass through the air injection port 57 to the nozzle 60. The nozzle 60 is constructed such that the secondary air forms an umbrella-like shield in front of the hole or central region of the catalyzed structure thereby diverting flow away from the hole 49 and into the peripheral regions 50 of the catalyzed structure.

Alternatively, the air injection port 57 and the cone-shaped nozzle 60 can be positioned at the outlet end of the catalyzed structure 10 to redirect exhaust gases back through the hole during cold start as shown in FIG. 7b.

Figure 8A:
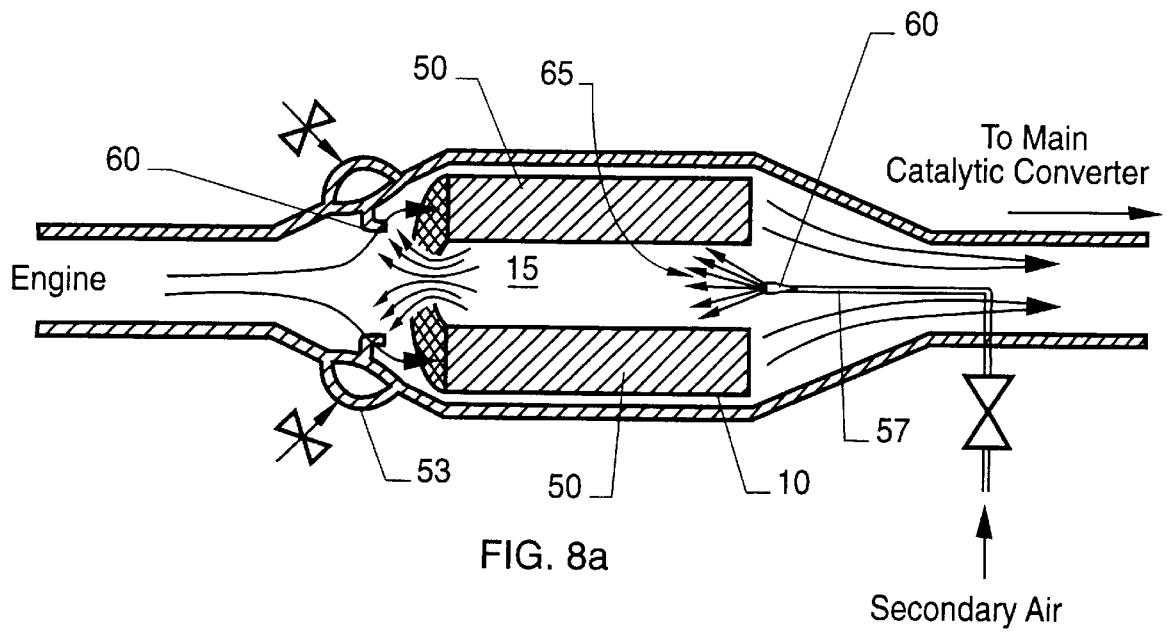
FIGS. 8a and 8b show the optional use of an additional flow diverter at the inlet end of the close-coupled honeycomb structure, specifically
Figure 8B:
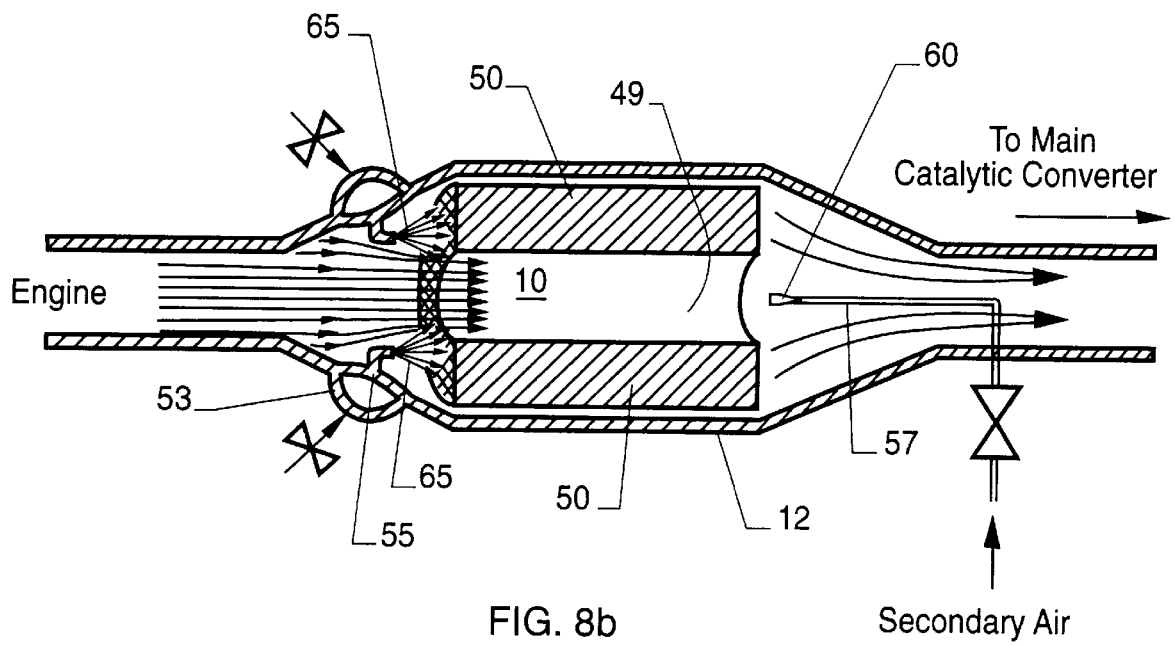

Referring now to FIGS. 8a and 8b, another embodiment is illustrated in which secondary air jets for diverting flow after light-off may be introduced into the housing 12 through an air injection collar 53 having a plurality of cone-shaped directional nozzles 55. Before light-off, flow through the center region 49 is prevented by use of a flow diverter 57 positioned at the outlet end of the catalyzed structure 10 as shown in FIG. 8b, to redirect exhaust gas flow back through the center 49 and through the peripheral region 50 of the close-coupled catalyst structure 10. Alternatively, the air injection port 57 may be further elongated to extend from the outlet to the inlet end of the close-coupled catalyst such that the nozzle 60 is disposed in front of the hole 15 on the inlet end of the catalyzed structure.

After light-off, flow through nozzle 60 is discontinued and secondary air flow through the nozzles 55, are used to effectively force a large portion of the engine exhaust gases through the hole 15 as shown in FIGS. 8a and 8b to quickly bring the main catalyst to its effective light-off temperature. While the tubular air injection port and the air injection collar are shown on the inlet end of the housing, such devices may also or instead be located on the outlet end of the catalyzed structure housing 12 to redirect air away from the hole in the same manner described above.

Figure 9A:
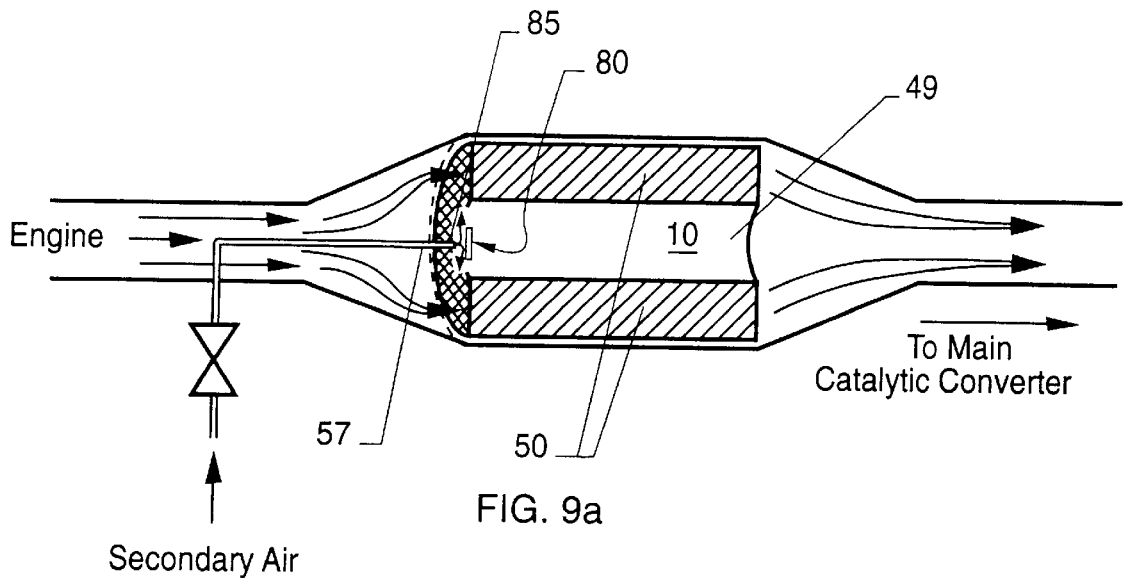
FIG. 9a shows the use of a air injection tube possessing a diverter plate to direct flow away from the first region during cold start.

In a final embodiment, as depicted in FIG. 9a, the diverter comprises a thin tubular air injection port 57, running parallel to the exhaust gas flow and fitted with a diverter plate 80, positioned at the inlet end of the close-coupled catalyzed structure housing, through which secondary air in the form of a radially directed jet 85 can be injected into the housing to effectively block off exhaust gas passage through the hole as shown. Preferably, the direction of the jet is approximately perpendicular to the direction of the exhaust gas flow. The air injection port 57 coupled with the diverter plate 80 are capable of projecting an air stream 85 from a secondary air source, to divert the exhaust gases towards the peripheral region 50 of the catalyzed structure 10 and away from the central hole 49 during cold start by blocking passage of exhaust gases through the hole. In other words, the air injection port 57 coupled with the diverter plate 80 combine together to direct a secondary air stream to effectively form a shield to prevent exhaust gas flow through the region of the catalyst along the exhaust path during cold start. In the embodiment illustrated, during cold start, the flow diverter means is activated by allowing secondary air to pass through the air injection port 57 to the diverter plate 80. The diverter plate 80 diverts the secondary air forming a radially directed air shield in front of the hole or central region 49 of the catalyzed structure 10 thereby diverting flow away from the hole 49 and into the peripheral regions 50 of the catalyzed structure 10.

Figure 9B:
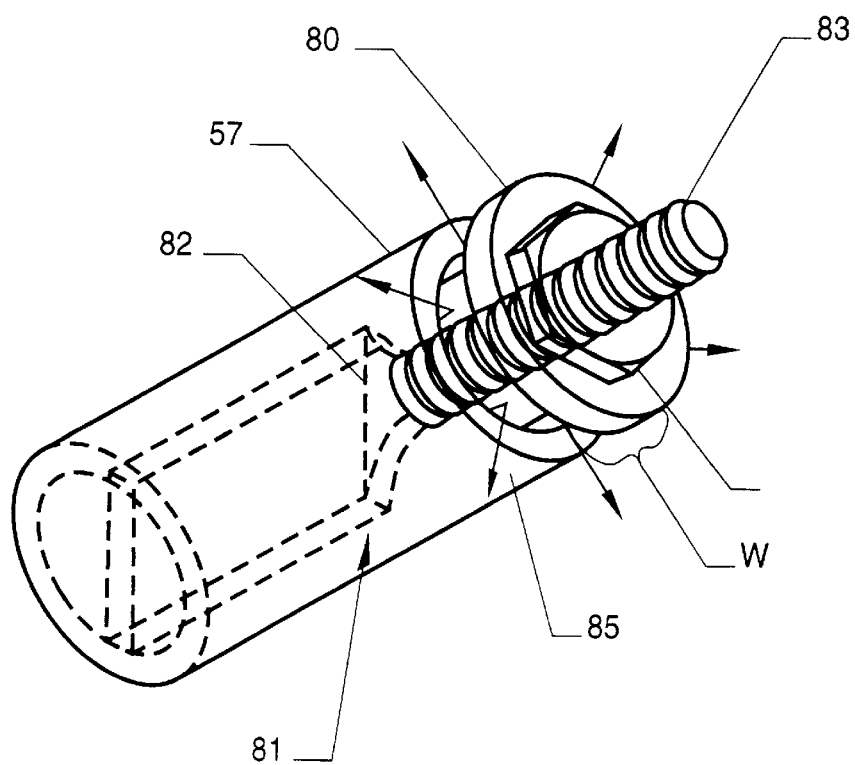

FIG. 9b illustrates, in more detail, the flow diverter means used in the preferred embodiment illustrated above in FIG. 9a. The diverter plate 80 is positioned, a variable slot distance W, in front of the outlet of the air injection port 57, through the use of a diverter plate support system 81. Diverter plate support system 81 consists of a support member 82 which is secured within the inside circumference of the tubular injection port and a threaded post 83 which extends out of the air injection port 57. Diverter plate 80 is directly attached to threaded post 83 allowing for the slot width to be varied. It should be noted that, although the preferred slot width is that width which results in an air flow which is perpendicular to the direction of the exhaust gas, the slot width may be increased resulting in a radial flow which is more cone-like in shape.

In any of the embodiments described above, secondary air from the same or a separate source may also be used as needed during vehicle operation to control the temperature of the close-coupled catalytic structure. For example, after the engine has heated up, secondary air can be injected into the close-coupled catalytic structure in the same manner described above, to provide cooling air to the catalytic structure after the engine has heated and the main catalytic structure has attained it light off temperature. This additional secondary air will operate to maintain the close-coupled catalytic structure at temperatures below its degradation temperature during the period after the main catalyst has attained its light-off temperature Although nonlinear, we have found that the larger the hole size, the greater the proportion of exhaust gases that flow through the hole and the central region of the catalyzed structure. Preferably, the hole size or the size of the large cells in the central region of the catalyzed structure are such as to allow a sufficient amount of the exhaust gases to flow through the catalyzed structure during cold start to meet the Federal Test Procedure (FTP) standards. At the same time, the hole size should be such as to allow a sufficient amount of exhaust gases to reach the burn-off catalyst so as to quickly bring it to its light-off temperature. The optimal hole size for a given application may be determined experimentally and will depend on such factors as the engine size, the volume of the catalyzed structure, the geometric surface area of the catalyzed structure, the efficiency of the particular catalyzed structure material, the operating conditions and other variables.

Figure 10:
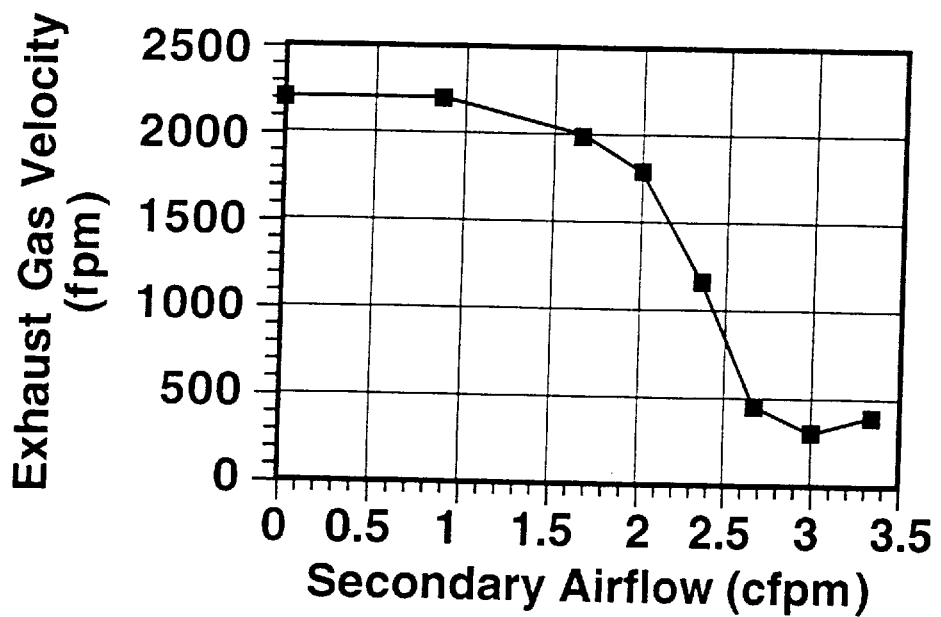
FIG. 10 is a graph showing the exhaust gas velocity measured in the center of the hole on the outlet end of the catalyzed structure as a function of the volumetric flow rate of the secondary air of the diverter before light-off.

To illustrate the effectiveness of the fluidic flow diverter of the invention as measured by the degree to which hydrocarbon-bearing exhaust gas is successfully prevented from passing through the hole during cold start, the following experiment was done. With the diverter activated in a configuration similar to those illustrated in FIGS. 7–9, exhaust gas was simulated by passing air into a housing at a volumetric flow rate of 40 cubic feet per minute (CFPM). An elongated flow diverter was placed in the housing along the center of the hole, extending from the outlet to the outlet end of a honeycomb structure such that the cone-shaped nozzle is disposed in front of the hole at the inlet end of the honeycomb structure. With the simulated exhaust gas flowing at the specified rate, the flow diverter was activated by passing secondary air to form a cone-shaped air shield over the entrance of the hole. Using a probe positioned in the region of the hole at the outlet end of the catalyzed structure, the linear velocity of the exhaust gas (simulated) passing through the hole was measured as a function of the secondary air volumetric flow rate given in the graph in cubic feet per minute (cfpm). The results are plotted in FIG. 10. As shown, as the secondary air flow rate increases, the exhaust gas is increasingly diverted to the peripheral regions of the honeycomb structure as indicated by the decrease in the exhaust gas flow rate through the hole as measured by the probe. The higher the secondary air flow rate, the stronger the air jet, and the more the amount of exhaust gas diverted. Specifically, the flow rate of the exhaust gas measured at the outlet of the hole falls from a maximum or about 2300 linear feet per minute with no diverter, to about 300 fpm at a secondary air flow of about 3 cfpm.

By using flow diverters as described above, catalytic structures having larger hole sizes or more open central regions can be used since the diverter can be used to direct substantially all of the exhaust gases away from the central region and into the peripheral regions. In this embodiment using flow diverters, the hole size may be as high as 50% of the honeycomb structural frontal area or more provided that the remaining honeycomb catalyzed structure is capable of catalyzing a sufficient amount of the hydrocarbons during cold start to meet the FTP test standards.

Suitable catalysts for use in the instant apparatus and method are any of those catalysts which are capable not only of oxidizing hydrocarbons to form water and carbon dioxide but also of converting carbon monoxide and NOx in the engine exhaust stream to innocuous products. Such catalysts, well known in the art and commonly used in automotive catalytic converters, include noble metal oxidation catalysts such as platinum, rhodium, and palladium as well as mixtures of these. It is contemplated that these catalysts may be incorporated into the honeycomb structure by known methods.

As discussed above, three-way converters which additionally convert NOx and carbon monoxide to non-toxic by-products may also be used in the practice of the invention. Typically, three-way catalysts used in automotive applications comprise noble metals such as platinum and/or palladium, and rhodium. Examples of such catalysts include platinum/palladium/rhodium on gamma alumina with rare earth oxides (e.g., ceria), and platinum on ceria-alumina combined with rhodium on zirconia.

The substrate can be any material suitable for high temperature application such as certain metals, metal alloys, ceramics, glass-ceramics, glass, high surface area-high temperature stable oxides, and combinations of these materials. Examples of useful substrate materials include, cordierite, mullite, clay, talc, zircon, zirconia, spinel, alumina, silica, borides, lithium aluminosilicates, alumina silica, feldspar, titania, fused silica, nitrides, carbides and mixtures of these. Useful metals for the substrate include, substrates formed of iron group metals such as Fe—Al, Fe—Cr—Al alloys, stainless steel, and Fe—Nickel alloys.

In addition to the embodiments discussed above, it will be clear to persons skilled in the art that numerous modifications and changes can be made to the above invention without departing from its intended spirit and scope.

I claim:

1. A method of treating a hydrocarbon-containing engine exhaust stream comprising:

causing exhaust gases from an engine exhaust gas stream to flow through a close-coupled catalyzed structure and thereafter through a main catalyzed structure having a light-off temperature, wherein the close-coupled catalyzed structure has an inlet and an outlet end located in a housing, a light-off temperature, and a first substantially unobstructed flow region, and a second more obstructed flow region abutting the first region, the flow through the close-coupled catalyzed structure involving, prior to the main catalyzed structure attaining its light-off temperature, activating a secondary air source located in the housing capable of diverting a substantial portion the exhaust gases away from the first region and through the second region.

2. The method of treating a hydrocarbon-containing engine exhaust stream as claimed in claim 1 wherein, after the main catalyzed structure has attained its light-off temperature, a secondary air is de-activated to cause a substantial portion of the exhaust gases to flow through the first region and away from the second region.

3. An in-line engine exhaust system comprising:

a first close-coupled catalyzed structure engine and located in the exhaust stream, the catalyzed structure having an inlet and an outlet end disposed in a housing, a lightoff temperature, and comprising a first substantially unobstructed flow region, and a second more obstructed flow region abutting the first region, the first region being disposed to provide a substantially unobstructed flow path for exhaust gases in the exhaust gas stream;

a flow diverter connected to a secondary air source and disposed in the housing for diverting the exhaust gases away from the first region.

4. The exhaust system of claim 3, wherein the flow diverter comprises a tubular air injection port having a plurality of cone-shaped directional nozzles, an air injection collar having a plurality of nozzles, a tubular air injection port possessing a cone-shaped air injection nozzle, a tubular air injection port possessing a diverter plate, an air injection tube or combinations of these.

5. The exhaust system of claim 4, wherein the flow diverter is disposed in the housing at a location selected from the group consisting of the inlet end, the outlet end, or a combination of these.

6. The exhaust system of claim 4, wherein a second catalyzed structure is located in the exhaust gas stream downstream from the housing.

7. The exhaust system of claim 6, wherein the second catalyzed structure comprises a three-way catalyst, a light-off catalyst, an oxidation catalyst or an electrically heated catalyst or combinations thereof.

8. The exhaust system of claim 4, wherein the first catalyzed structure comprises a three-way catalyst, a light-off catalyst, or an oxidation catalyst.

9. The exhaust system of claim 4, wherein the first catalyzed structure is selected from the group consisting of (1) a variable cell honeycomb structure having a first group of cells and a second group of cells whose cell sizes are smaller than the first group of cells, or (2) a substantially cellular structure having an open core region running longitudinally parallel between the inlet and outlet ends of the structure and a peripheral region abutting the open core, the peripheral region having a plurality of cells running longitudinally parallel between the inlet and the outlet ends of the structure.

10. The exhaust system of claim 9, wherein the first catalyzed structure is centrally disposed in the housing, has a frontal area and a lightoff temperature, wherein the first region comprises a central open core running longitudinally parallel between the inlet and outlet ends of the structure and the second region comprises a peripheral cellular structure comprising a plurality of cells running longitudinally parallel between the inlet and the outlet ends of the structure.

11. The exhaust system of claim 9, wherein the first catalyzed structure comprises a honeycomb structure having a peripheral cellular region surrounding a central open core.

12. The exhaust system of claim 10, wherein the central open core occupies an area in the range of 0.5 to 50% of the frontal area of the honeycomb structure.

13. The exhaust system of claim 10, wherein the first catalytic converter structure comprises a variable cell honeycomb structure having a first central region and a second peripheral region surrounding the first region wherein cells in the first region are larger than the cells in the second region.

14. The exhaust system of claim 3, wherein the first catalyzed structure comprises a catalyst selected from the group consisting of noble metal catalysts, including platinum, rhodium or palladium or mixtures of these.

15. The exhaust system of claim 3 wherein the first catalyzed structure comprises a catalyst supported on a substrate.

16. The exhaust system of claim 15 wherein the substrate is in a form selected from the group consisting of pellets and cellular monoliths.

17. The exhaust system of claim 16 wherein the cellular monolith is either an extruded ceramic honeycomb structure or a wrapped and welded metal sheet honeycomb structure.

18. The exhaust system of claim 16, wherein the flow diverter comprises a tubular air injection port having a plurality of cone-shaped directional nozzles, an air injection collar having a plurality of nozzles, a tubular air injection port possessing a cone-shaped air injection nozzle, a tubular air injection port possessing a diverter plate, an air injection tube or combinations of these.

19. An in-line engine exhaust system comprising:

a close-coupled housing having an inlet and outlet end;

a first catalyzed structure having an inlet and outlet end centrally located within the housing, the catalyzed structure comprising a honeycomb structure having a cellular peripheral region having a plurality of cells running longitudinally parallel between the inlet and outlet ends of the structure, the peripheral region surrounding an open core central region also running longitudinally parallel between the inlet and the outlet ends of the structure;

a second catalytic converter structure having a light-off temperature, located downstream from the first catalyzed structure, such that an exhaust gas stream is formed connecting the engine and the second catalyzed structure through the housing, and such that the open core provides a substantially unobstructed flow path for exhaust gases in the exhaust stream from the engine to the second catalyzed structure; and, flow diverter connected to a secondary air source and disposed in the housing for diverting engine gases away from the open core prior to the second catalyzed structure attaining its light-off temperature.

20. The exhaust system of claim 19, further comprising additional flow diverters disposed on the inlet end of the housing for diverting the exhaust gases towards the open core central region after the second catalyzed structure attains its light-off temperature.

21. The exhaust system of claim 19, wherein the flow diverter is disposed in the housing and proximate to the close-coupled catalyzed structure at a location selected from the group consisting of the inlet end, the outlet end, or a combination of these.

22. The exhaust system of claim 19, wherein the catalyzed structure comprises a catalyst selected from the group consisting of noble metal catalysts, such as platinum, rhodium, palladium, or mixtures of these.

23. The exhaust system of claim 19 wherein the catalyzed structure comprises a catalyst supported on a substrate.

24. The exhaust system of claim 23 wherein the substrate is in a form selected from the group consisting of pellets and cellular monoliths.

25. The exhaust system of claim 24 wherein the cellular monolith is either an extruded ceramic honeycomb structure or a wrapped and welded metal sheet honeycomb structure.

26. The exhaust system of claim 23, wherein the honeycomb structure possesses a central region having large cells and a peripheral region surrounding the central region, having cells which are smaller than the cells in the central region.

27. The exhaust system of claim 23, wherein the second catalyzed structure comprises a three-way catalyst, a light-off catalyst, an oxidation catalyst or an electrically heated catalyzed or combinations thereof.

28. The exhaust system of claim 23, wherein the first catalyzed structure comprises a three-way catalyst, a light-off catalyst, or an oxidation catalyst.

* * * * *

UNITED STATES PATENT AND TRADEMARK OFFICE
CERTIFICATE OF CORRECTION

PATENT NO  : 5,850,734
DATED      : Dec. 22, 1998
INVENTOR(S):  Ketcham

It is certified that error appears in the above-identified patent and that said Letters Patent is hereby corrected as shown below:

Column 10, line 20, "a secondary" should be --the secondary--.

Column 10, line 54, "claim 4" should be --claim 3--.

Column 11, line 15, "claim 10" should be --claim 12--.

Signed and Sealed this

Third Day of August, 1999

*Attest:*

Q. TODD DICKINSON

*Attesting Officer*     *Acting Commissioner of Patents and Trademarks*